(12) United States Patent
McLean et al.

(10) Patent No.: US 10,131,021 B2
(45) Date of Patent: Nov. 20, 2018

(54) METHOD FOR MANUFACTURING A FORGING DIE WITH IMPROVED WEAR RESISTANCE

(71) Applicants: Carl P. McLean, Conneaut Lake, PA (US); William G. Biery, Meadville, PA (US); John R. Paules, Cranberry Township, PA (US); Philip Nash, Chicago, IL (US)

(72) Inventors: Carl P. McLean, Conneaut Lake, PA (US); William G. Biery, Meadville, PA (US); John R. Paules, Cranberry Township, PA (US); Philip Nash, Chicago, IL (US)

(73) Assignee: Meadville Forging Company, Meadville, PA (US)

( * ) Notice: Subject to any disclaimer, the term of this patent is extended or adjusted under 35 U.S.C. 154(b) by 456 days.

(21) Appl. No.: 15/048,025

(22) Filed: Feb. 19, 2016

(65) Prior Publication Data

US 2016/0271744 A1    Sep. 22, 2016

Related U.S. Application Data

(60) Provisional application No. 62/135,381, filed on Mar. 19, 2015.

(51) Int. Cl.
*B23P 15/24* (2006.01)
*C23C 8/26* (2006.01)
*C22C 38/24* (2006.01)
*C22C 38/22* (2006.01)
*C22C 38/04* (2006.01)
*C22C 38/02* (2006.01)
*C22C 38/00* (2006.01)
*B21K 5/20* (2006.01)

(52) U.S. Cl.
CPC ................ *B23P 15/24* (2013.01); *B21K 5/20* (2013.01); *C22C 38/002* (2013.01); *C22C 38/02* (2013.01); *C22C 38/04* (2013.01); *C22C 38/22* (2013.01); *C22C 38/24* (2013.01); *C23C 8/26* (2013.01)

(58) Field of Classification Search
CPC .............. C23C 8/26; B23P 15/24; B21J 13/02
See application file for complete search history.

(56) References Cited

U.S. PATENT DOCUMENTS

2007/0245799 A1*  10/2007  Asakawa ................ B21J 13/02
                                                                  72/467

* cited by examiner

*Primary Examiner* — Jessee R Roe
(74) *Attorney, Agent, or Firm* — Schiff Hardin LLP

(57) ABSTRACT

In a method for manufacturing a forging die with improved wear resistance, hot-work tool steel is obtained in which Al is added as a de-oxidizing agent during manufacture of the hot-work tool steel in a sufficient quantity such that it is only partially consumed during the de-oxidizing process, leaving Al in a range of greater than 0.015 weight percent after the de-oxidizing process. The forging die is shaped from the hot-work tool steel. By a subsequent nitriding process, a hardened surface is created on the forging die by heating in a nitriding atmosphere by interaction with the Al to improve a hardened surface on the hot-work forging die resulting in an improvement in wear resistance.

18 Claims, 2 Drawing Sheets

METHOD FOR MANUFACTURING A FORGING DIE WITH IMPROVED WEAR RESISTANCE

RELATED APPLICATION

The present invention claims the benefit of the filing date of Provisional Application Control No. 62/135,381, filed on Mar. 19, 2015.

BACKGROUND OF THE INVENTION

Description of the Prior Art

Manufacture of parts by forging in a hot-work or cold-work forging process by use of a respective hot-work forging die or cold-work forging die is known. In the cold-work forging process, a cold-work forging die is used in which steel part material is inserted into the die in a low temperature process in a typical temperature range of 0-1900° F. In a hot-work forging process, a hot-work forging die is used to create forged parts by insertion of steel part material into the die and hot-work forging in a temperature range of typically 1750° F.-2425° F. and more specifically 1900° F.-2350° F.

In order to improve die life for hot-work or cold-work forging it is known to employ a nitriding process. This creates a hardened surface which improves die life so that more parts can be forged in view of improved wear resistance. More specifically, a cold-work forging die is subjected to a nitriding process with the use of aluminum (Al) to create a hardened surface on the cold-work forging die. For creation of H13 hot-work tool steel aluminum is not specified for the final H13 hot-work tool steel prior to the nitriding process since it is known to weaken the steel. However, it is used as a de-oxidizing agent during manufacture of the hot-work tool steel, such as by a steel mill producing the hot-work tool steel. The aluminum is preferably substantially consumed during the oxidizing process leaving no or only a trace amount of aluminum no greater than 0.015 weight percent.

FIG. 1 is a flowchart illustrating steps in the prior art manufacturing process. In step 10 typical weight percents for various elements for manufacturing H13 hot-work tool steel are shown, but with no specification for Al or a specification to provide no greater than 0.015 weight percent of Al after the oxidizing process. These weight percents are typically found in industry standards for H13 hot-work tool steel with cross reference specifications AISI (H13), AMS 6408, ASTM 8681 (H13), SAE J437 (H13), J438 (H13), and J467 (H13). Also see the NADCA 207 standard.

As shown in step 10, there is typically no specification for Al, or if a specification is provided, then the Al is specified such that after the oxidizing process Al remaining is preferably no greater than 0.015 weight percent.

As shown in step 11, during manufacture of the hot-work tool steel such as by a mill it is known to add a limited quantity of Al as a de-oxidizing agent to be consumed during the oxidizing process, leaving no, or only a trace amount of Al, no greater than 0.015 weight percent. It was previously believed that for such hot-work tool steel to have Al left over after the de-oxidizing process was a disadvantage since it weakens the hot-work tool steel being sold by the mill.

As shown in step 12, the manufactured hot-work tool steel is machined to create a hot-work forging die. Thereafter as shown in step 13, by a nitriding process a hardened surface is created on the hot-work forging die by heating in a nitrogen gas atmosphere in a typical temperature range of 800° F.-1200° F. by nitrogen diffusion. Thereafter as shown in step 14, by use and reuse of the hot-work forging die, multiple forged parts can then be created by insertion of steel part material into the die and hot-work forging in a temperature range of 1750° F.-2425° F. and more preferably 1900° F.-2350° F. The hardened surface created by the nitriding eliminates or reduces cracking of the die and improves wear resistance, allowing the die to be used a greater number of times in creation of the multiple forged parts.

Although it is known with cold-work steel for use in creating a cold-work forging die to provide aluminum for use in the nitriding process to create a hardened surface thereon, the use of aluminum for use in the nitriding process on a hot-work forging die was considered a disadvantage since aluminum used in the de-oxidizing process during manufacture of the hot-work steel was considered to weaken the hot-work tool steel.

SUMMARY

It is an object to improve wear resistance of a forging die, particularly in a forging die used in hot-work forging.

In a method for manufacturing a forging die with improved wear resistance, hot-work tool steel (also usable for cold-work) is obtained in which Al is added as a de-oxidizing agent during manufacture of the hot-work tool steel in a sufficient quantity such that it is only partially consumed during the de-oxidizing process, leaving Al in a range of greater than 0.015 weight percent after the de-oxidizing process. The forging die is shaped from the hot-work tool steel. By a subsequent nitriding process, a hardened surface is created on the forging die by heating in a nitriding atmosphere by interaction with the Al to improve a hardened surface on the forging die resulting in an improvement in wear resistance.

DESCRIPTION OF EXEMPLARY EMBODIMENTS

Figure 1:
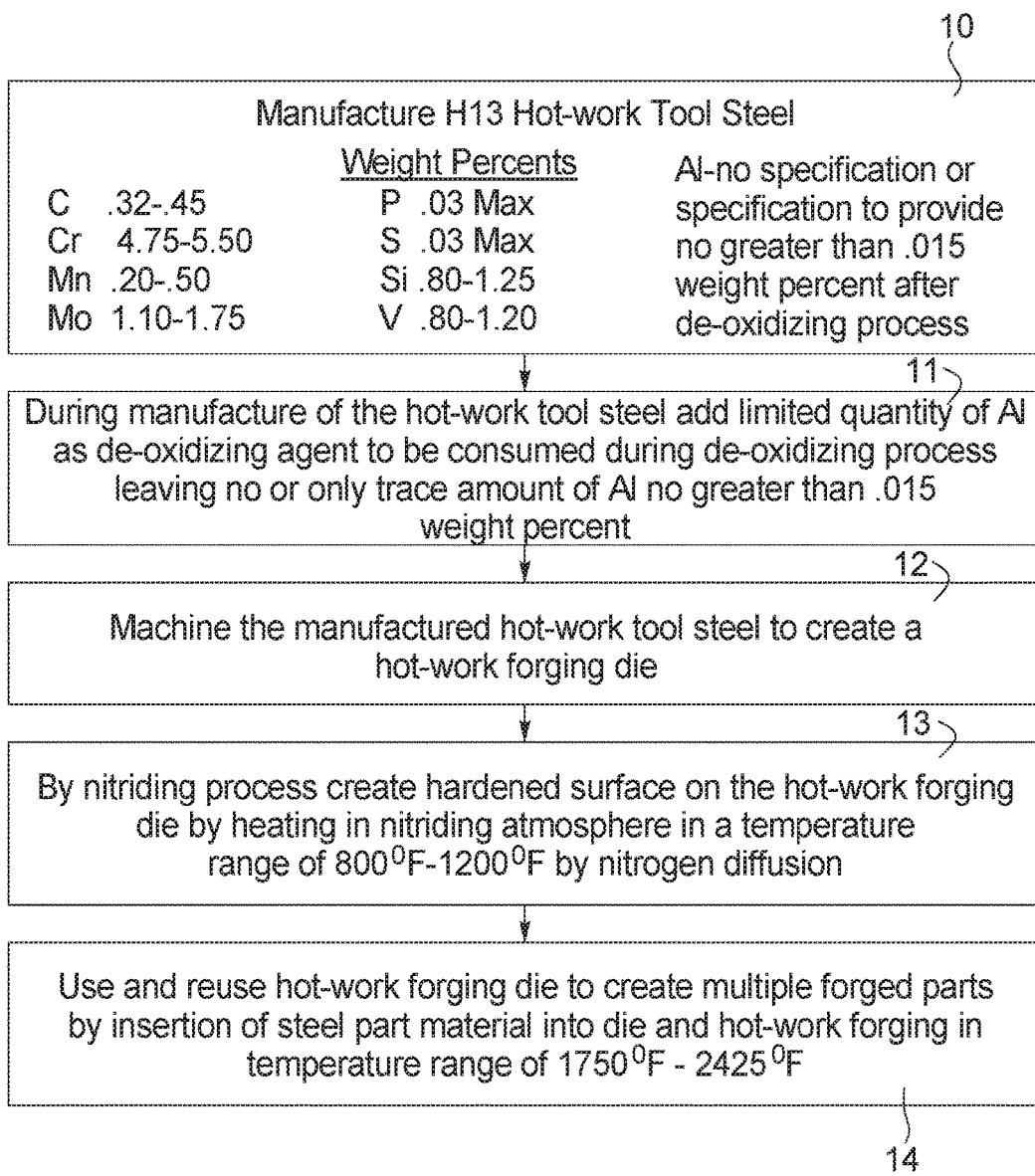
FIG. 1 is a flowchart showing manufacturing process steps according to the prior art for manufacture of a hot-work forging die used for forging parts in a hot-work forging operation.

For the purposes of promoting an understanding of the principles of the invention, reference will now be made to the preferred exemplary embodiments/best mode illustrated in the drawings and specific language will be used to describe the same. It will nevertheless be understood that no limitation of the scope of the invention is thereby intended, and such alterations and further modifications in the illustrated embodiments and such further applications of the principles of the invention as illustrated as would normally occur to one skilled in the art to which the invention relates are include herein.

Figure 2:
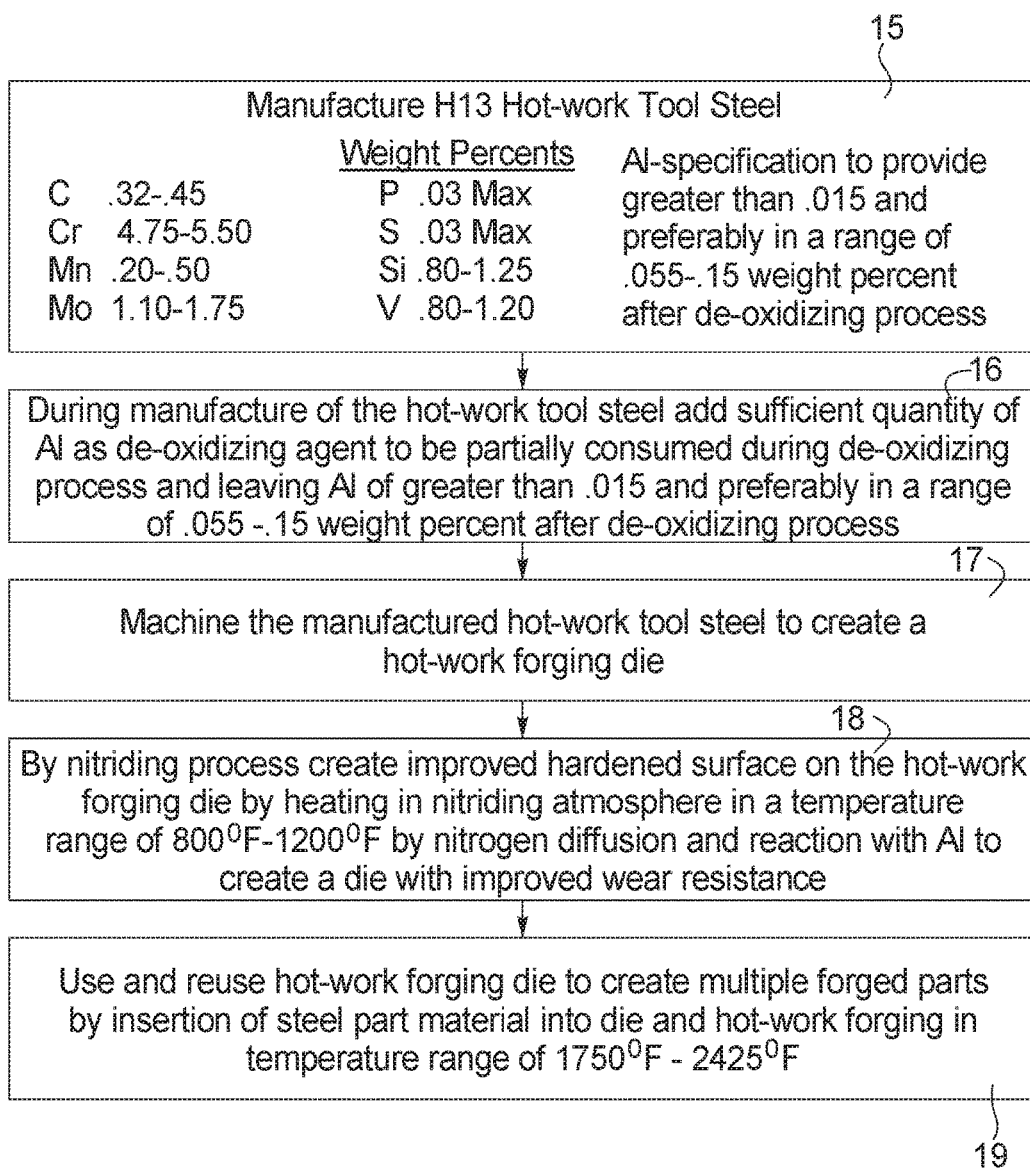
FIG. 2 is a flowchart showing steps in an improved manufacturing process for manufacturing a forging die having an improved hardened surface resulting in improved wear resistance of the forging die.

As shown for the improved process in FIG. 2, at step 15 H13 hot-work tool steel (also suitable for cold-work) is manufactured with some similarity to the manufacture in prior art step 10 but with a specification provided for aluminum such that sufficient aluminum remains in a range of greater than 0.015 and preferably in a range of 0.055-0.15 weight percent and more preferably in a range 0.055-0.09 weight percent and more preferably in a range of 0.055-0.15 weight percent after a de-oxidizing process.

In step 16 during manufacture of the H13 hot-work tool steel, a sufficient quantity of Al as a de-oxidizing agent is provided to be partially consumed during the oxidizing process and leaving Al of greater than 0.015 weight percent and preferably in a range of 0.055-0.15 weight percent and more preferably in a range of 0.055-0.09 weight percent after the de-oxidizing process.

In step 17 the manufactured hot-work tool steel is shaped by machining to create a forging die.

In step 18 using similar nitriding process parameters as in the prior art step 13, an improved hardened surface is created on the forging die by heating in a nitriding atmosphere in a temperature range of preferably 800° F.-1200° F. by nitrogen diffusion and reaction with Al to create a die with improved wear resistance.

Thereafter is shown in step 19 the forging die can be used and reused to create multiple forged parts by insertion of the steel part material into the die and hot-work forging in the known prior art temperature range of 1750° F.-2425° F. and more preferably 1900° F.-2350° F. However in view of the improved hardened surface on the die and consequent improved wear resistance, more parts can be forged as compared to the prior art hot-work forging die. This is a surprising and unexpected result in view of the use of the Al in the nitriding process resulting in the die with the improved hardened surface and improved wear resistance.

As noted above, although the improved forging die has particular benefits in the context of hot-work forging, it is also usable for cold-work forging.

Although preferred exemplary embodiments are shown and described in detail in the drawings and in the preceding specification, they should be viewed as purely exemplary and not as limiting the invention. It is noted that only preferred exemplary embodiments are shown and described, and all variations and modifications that presently or in the future lie within the protective scope of the invention should be protected.

We claim as our invention:

1. A method for manufacturing a hot-work forging die with improved wear resistance, comprising the steps of:
    obtaining hot-work tool steel in which Al is added as a de-oxidizing agent during manufacture of the hot-work tool steel in a sufficient quantity such that the Al it is only partially consumed during a subsequent de-oxidizing process during said manufacture and leaving Al in a range of 0.055-0.15 weight percent after the de-oxidizing process;
    shaping the manufactured hot-work tool steel to create a forging die; and
    by a subsequent nitriding process creating a hardened surface on the forging die by heating in a nitriding atmosphere by nitrogen diffusion and reaction with the Al to improve a hardened surface on the forging die resulting in an improvement in wear resistance.

2. The method of claim 1 wherein in the Al is left in a range of 0.055-0.09 weight percent.

3. The method of claim 1 wherein the forging die is used to create multiple forged parts by insertion of steel part material into the die and hot-work forging.

4. The method of claim 3 wherein the hot-work forging is in a temperature range of 1750° F.-2425° F.

5. The method of claim 4 wherein the hot-work forging is in a temperature range of 1900° F.-2350° F.

6. The method of claim 1 wherein the hot-work forging die has a hardened surface sufficient for hot-work forging a steel part material to create forged parts in a temperature range of 1750° F.-2425° F.

7. The method of claim 6 wherein the temperature range to create the forged parts is 1900° F.-2350° F.

8. The method of claim 1 wherein the nitriding process is performed in a temperature range of 800° F.-1200° F.

9. The method of claim 1 wherein the forging die is used to create multiple forged parts by insertion of steel part material into the die and cold-work forging.

10. The method of claim 1 wherein the hot-work tool steel obtained for manufacture of the hot-work forging die comprises elements with the following weight percents:
    C 0.32-0.45
    Cr 4.75-5.50
    Mn 0.20-0.50
    Mo 1.10-1.75
    P 0.03 Max
    S 0.03 Max
    Si 0.80-1.25
    V 0.80-1.20.

11. A method for manufacturing a forging die with improved wear resistance, comprising the steps of:
    manufacturing hot-work tool steel in which Al is added as a de-oxidizing agent during manufacture of the hot-work tool steel but which is added in a sufficient quantity such that it is only partially consumed during an oxidizing process during said manufacture and leaves Al in a range of 0.055-0.15 weight percent after the de-oxidizing process;
    shaping the manufactured hot-work tool steel to create a forging die; and
    by a subsequent nitriding process creating a hardened surface on the forging die by heating in a nitriding atmosphere by interaction with the Al to improve a hardened surface on the forging die resulting in an improvement in wear resistance.

12. The method of claim 11 wherein the hot-work forging die is used to create multiple forged parts by insertion of steel part material into the die and hot-work forging.

13. The method of claim 12 wherein the hot-work forging is in a temperature range of 1750° F.-2425° F.

14. The method of claim 11 wherein the hot-work forging die has a hardened surface sufficient for hot-work forging a steel part material to create forged parts in a temperature range of 1750° F.-2425° F.

15. The method of claim 11 wherein the nitriding process is performed in a temperature range of 800° F.-1200° F.

16. The method of claim 11 wherein the forging die is used to create multiple forged parts by insertion of steel part material into the die and cold-work forging.

17. The method of claim 11 wherein the hot-work tool steel obtained for manufacture of the hot-work forging die comprises elements with the following weight percents:
    C 0.32-0.45
    Cr 4.75-5.50
    Mn 0.20-0.50
    Mo 1.10-1.75
    P 0.03 Max
    S 0.03 Max
    Si 0.80-1.25
    V 0.80-1.20.

18. A method for manufacturing a forging die with improved wear resistance, comprising the steps of:

obtaining hot-work tool steel in which Al is added as a de-oxidizing agent during manufacture of the hot-work tool steel, but which is added in a sufficient quantity such that it is only partially consumed during a subsequent de-oxidizing process during said manufacture and leaving Al in a range of greater than 0.015 weight percent after the de-oxidizing process;

shaping the manufactured hot-work tool steel to create a forging die; and by a subsequent nitriding process creating a hardened surface on the forging die by heating in a nitriding atmosphere by interaction with the Al to improve a hardened surface on the forging die resulting in an improvement in wear resistance.

\* \* \* \* \*